Sept. 4, 1962      O. E. ANDRUS      3,052,527

APPARATUS FOR REMOVING DISSOLVED OXYGEN FROM WATER

Filed May 3, 1957      2 Sheets-Sheet 1

INVENTOR.
ORRIN E. ANDRUS
BY Andrus & Seealse
Attorneys

Sept. 4, 1962          O. E. ANDRUS          3,052,527
APPARATUS FOR REMOVING DISSOLVED OXYGEN FROM WATER
Filed May 3, 1957          2 Sheets-Sheet 2
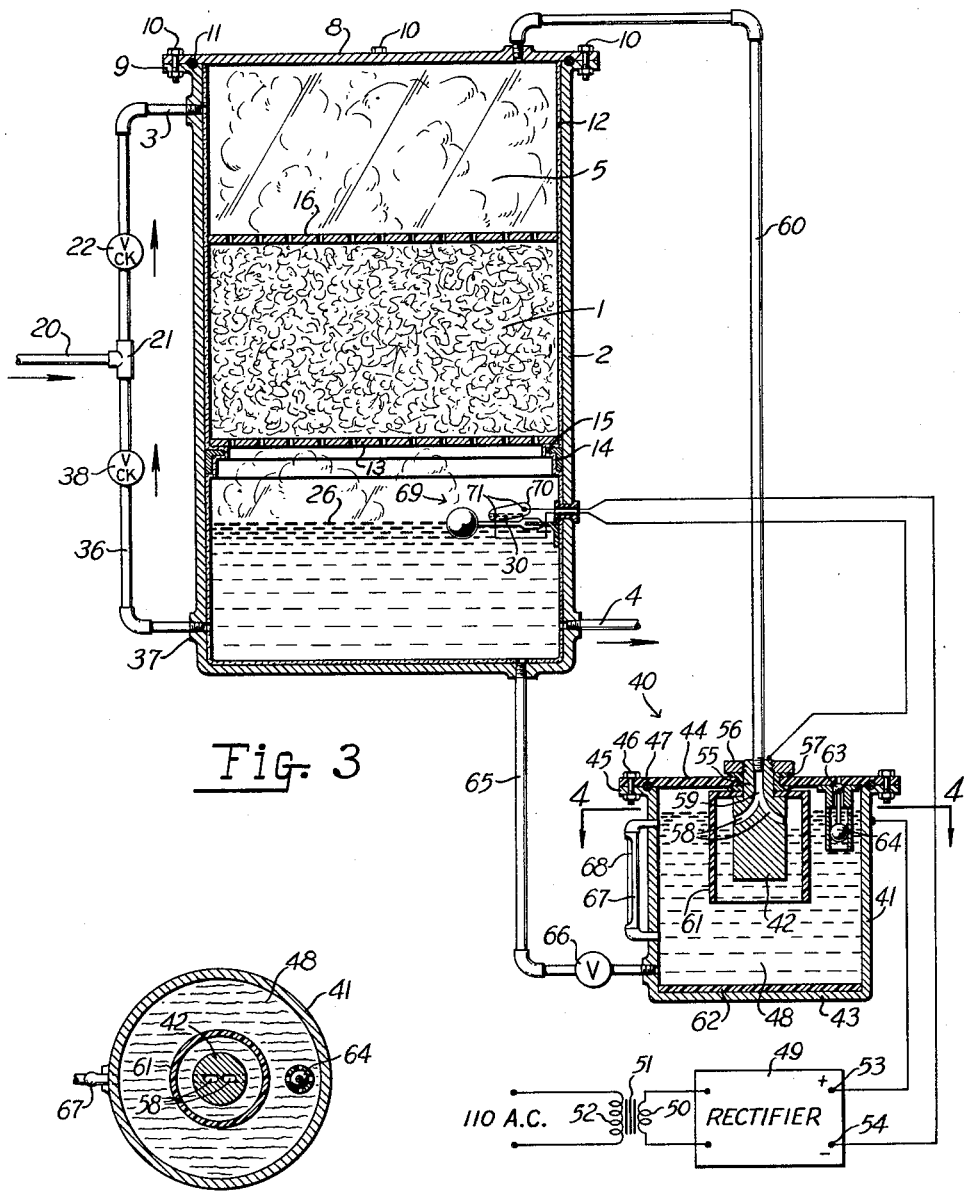
INVENTOR.
ORRIN E. ANDRUS
BY
Andrus & Scales
Attorneys

United States Patent Office 3,052,527
Patented Sept. 4, 1962

3,052,527
APPARATUS FOR REMOVING DISSOLVED OXYGEN FROM WATER
Orrin E. Andrus, Madison, Wis., assignor to A. O. Smith Corporation, Milwaukee, Wis., a corporation of New York
Filed May 3, 1957, Ser. No. 656,851
1 Claim. (Cl. 23—288)

This invention relates to a method and apparatus for removing dissolved oxygen from water and particularly to apparatus employing a catalyzing adsorbent material treated with hydrogen.

The problem of corrosion of metal surfaces in water systems due to the free oxygen in the water continues to be a source of great economic waste. As set forth in applicant's copending application entitled, Removal of Oxygen From Water, Serial Number 603,589, filing date August 13, 1956, and assigned with the present application to a common assignee, a number of different methods and apparatus has previously been suggested to overcome this problem. Generally, for one reason or another, all of these proposals have found at most only limited use.

As set forth in the referred to copending application, free oxygen in the water may be removed from the water by passing the water through an adsorbent bed having nascent hydrogen formed therein. The free oxygen and the nascent hydrogen combine to form water. One method of forming the hydrogen as described is by setting up an electrolytic current flow from an anode through the water to be treated to an adsorbent bed which is electrically conductive. It has been found that the surface of the treating bed at time becomes coated with minerals which apparently are precipitated onto the bed by the electrolytic current. When this occurs, the bed's efficiency is greatly reduced and the bed should be replaced. When a corrodable anode is employed it must be periodically replaced.

The referred to copending application further describes the use of a separate source of hydrogen gas which is connected to introduce hydrogen gas into the bed. A catalyst within the bed activates the hydrogen gas which then reacts with the dissolved oxygen in the water to form water. Although this latter method avoids the previously noted disadvantages of the electrolytic process, it is found to be substantially slower in operation. Further, if the bed is subjected to an excess of air, the catalytic action of the bed appears to be reduced.

The present invention avoids the noted problems in whole or in part, by employing a catalyzed adsorbent bed and a separate source of hydrogen gas within the bed maintained at least periodically in an atmosphere of hydrogen gas. This eliminates the problem noted in the electrolytic method and also maintains catalytic action.

The present invention provides a simple, efficient apparatus for oxygen removal which eliminates the clogging and degeneration of the adsorbent bed.

The drawings furnished herewith illustrate the best mode presently contemplated for carrying out the invention.

In the drawings:

FIG. 3 is a cross-sectional view of another embodiment of the invention; and

FIG. 4 is a view taken on line 4—4 of FIG. 3.

Figure 1:
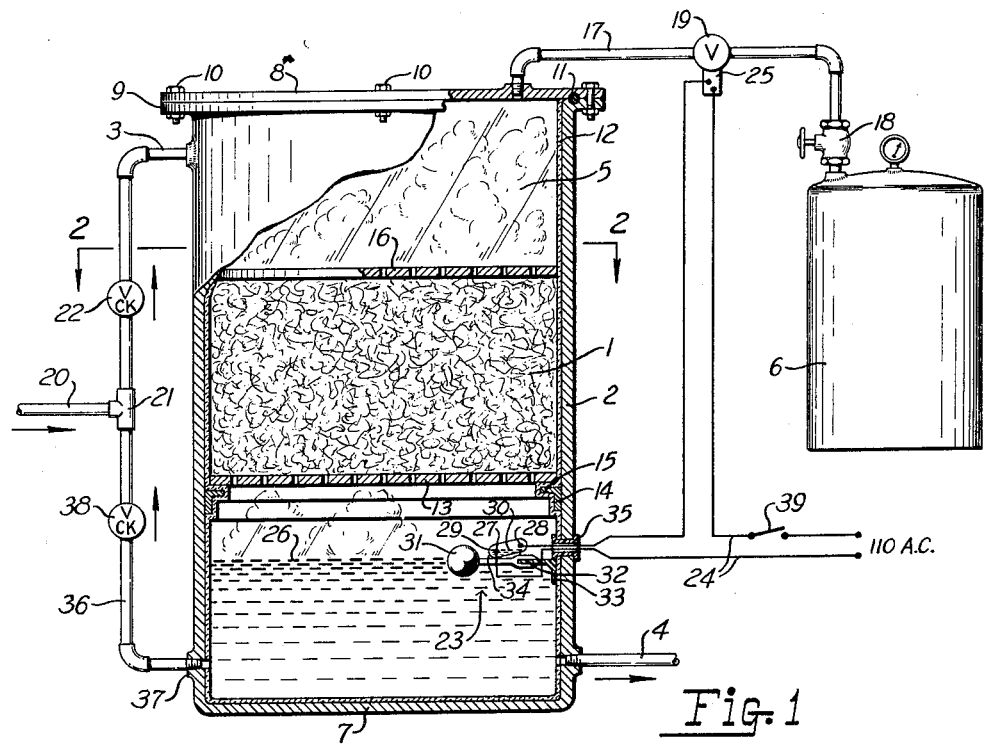
FIGURE 1 is a view in section of one embodiment of the invention.
Figure 2:
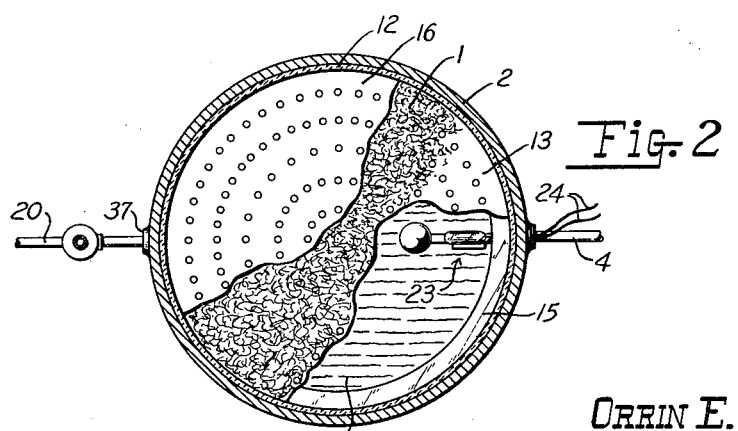
FIG. 2 is a view taken on line 2—2 of FIGURE 1.

Referring to FIGURE 1, the illustrated embodiment of the invention comprises a treating bed 1 supported within a closed tank 2 having a water inlet 3 and a water outlet 4 disposed respectively above and below the bed. Hydrogen gas 5 is introduced at the top of the tank from a suitable source such as a conventional bottle of gas 6 and control means are provided for maintaining the bed within a gaseous atmosphere when water is not passing through the tank.

The tank 2 has an integrally formed bottom 7 and a removable cover 8 which permits access to the interior of the tank. The cover 8 is bolted to a flange 9 on the top of the tank as by bolts 10 with an O-ring seal 11 to seal the joint therebetween. A glass lining 12 covers the inner surfaces of the tank 2 to prevent corrosion by the incoming water before it is treated to remove the dissolved oxygen.

The bed 1 is supported within the central portion of the tank 2 by a perforated plate 13 which rests on an annular ledge 14 protruding from the wall of the tank 2. The ledge 14 is an annular angle iron member which is welded or otherwise secured to the tank with a horizontal leg 15 extending into the tank.

A perforated plate 16 for water distribution rests on the upper surface of the bed 1 to spread out the incoming water and thereby prevent channeling of the water through the bed. As the incoming water contains free oxygen and is, therefore, corrosive, the upper plate 16 is preferably formed of a non-corrosive material such as plastic or the like.

The bed 1 comprises an adsorbent carrier having the characteristics of adsorbing hydrogen, having a large area to volume ratio, and preferably being electrically conducting. As in the referred to application, a highly satisfactory adsorbent is activated carbon particularly that formed from pecan shells.

Intermixed with the adsorbent is a suitable catalyst which causes the hydrogen gas within the bed to become active and polarize the bed.

Applicant has used platinum, palladium and a mixture thereof. The latter appears to give the most satisfactory results.

The catalyst is fixed to the adsorbent in any suitable manner. For example, platinum has been precipitated throughout the adsorbent by mixing the adsorbent and a platinum chloride solution. The mixture is then heated to drive off the water and to decompose the chloride with the formation of platinum on the large surface areas of the adsorbent.

Hydrogen gas 5 is introduced in the upper portion of the tank 2 by a conduit 17 which is secured within the cover 8 and is releasably connected to the conventional bottle 6 of hydrogen gas by a suitable valve fitting 18.

A solenoid valve 19 is secured within the conduit 17 and regulates the flow of hydrogen gas into the tank.

The inlet 3 is connected to the incoming water main 20 by a T connector 21 adjacent the center of the tank 2, extends vertically upward along the outer surface of the tank and communicates with the upper portion of the tank. A check valve 22 is secured in an intermediate vertical portion of the inlet 3 in spaced relation to the connection 21 to the tank 2. This arrangement provides a water seal above the check valve 22 and minimizes any opportunity for the gas 5 in the upper portion of the tank from leaking into the water main through the valve 22.

Although hydrogen gas can be transferred satisfactorily from the gaseous phase through the water to the bed, the rate of transfer is relatively slow and is more satisfactory when the bed is subject to a gaseous atmosphere between periods of water flow through the tank.

The desired action is obtained as follows. A float switch 23 is located below the level of the treating bed 1 and is connected in one of a set of power lines 24 for the solenoid valve 19 in the conduit 17. When the switch 23 is raised up by the rising of the water in the tank, it closes and completes the circuit for the solenoid 25 of valve 19. Upon energization, the solenoid 25 opens the valve 19 and admits hydrogen into the tank 2 which forces water out of the tank and lowers the water level 26 in the tank 2. After the water level is returned to normal, the switch 23 opens and discontinues the supply of gas. For purposes of illustration, switch 23 is illustrated as a mercury switch having a set of spaced contacts 27 and 28 sealed within a bulb 29 which contains a quantity of mercury 30. A float 31 is secured to the bulb 29 and to the horizontal leg 32 of an L-shaped member which has its vertical leg 33 secured to the interior surface of the tank 2. The leg 32 is formed of any suitable flexible material to allow the float to pivot in a vertical direction and thereby tip the bulb 29 up or down with the rising and falling of the water level. When the bulb 29 is tipped upwardly, the mercury 30 connects the contacts 27 and 28 and completes the power circuit for the solenoid 25. When the bulb 29 is tipped downwardly the mercury 30 drains to the one end 34 of the container and breaks the connection of the contacts 27 and 28. This opens the power supply to the solenoid 25 and the valve 19 closes the conduit 17.

One of the power lines 24 extends into the tank 2 through an opening in the tank 2 and is connected in series to the contacts 27 and 28. The opening in the tank wall through which the line 24 passes is sealed by a conventional sealing grommet 35.

To prevent the lowering of the water in the tank when variations in the water level occur due to pressure change, a by-pass pipe 36 is connected at one end to the lower portion of the tank 2 as at 37 below the normal water level and is connected at the opposite end to the water main 20 by the other side of the T connector 21 which also connects the inlet 3 to the incoming water main. A check valve 38 in the pipe 36 allows flow of water from the tank 2 to the water main but prevents flow of water from the water main to the tank. The incoming hydrogen gas 5 forces excess water back through the pipe 36 because check valve 22 prevents hydrogen from flowing out through inlet 3.

In operation, the hydrogen gas 5 is converted within the bed 1 to an active state. Apparently the hydrogen is then chemisorbed by the activated adsorbent bed 1. When the water is passed through the bed 1, the dissolved oxygen in the water reacts with the active hydrogen within the bed to form water.

After the bottle 6 becomes empty, it is replaced with a full one and the unit is again ready for continuous operation. A master switch 39 in the power lines 24 is opened to prevent energization of the solenoid 25 for valve 19 and consequent opening of the pipe 17 while changing the bottle.

Although the source of hydrogen in FIG. 1 is illustrated as bottle gas, any other source can be used, such as a separate electrolytic cell shown in FIGS. 3 and 4 described as follows:

Like structures in the embodiments of the invention illustrated in FIGS. 1 and 3 are designated by the same number and only the different manner of introducing the gas into the treating tank 2 of FIG. 3 is described in detail hereinafter.

The source of hydrogen, as previously noted, is illustrated as an electrolytic cell 40 which comprises a cylindrical metallic container 41 maintained anodic with respect to a cathode 42 secured within the container.

The container 41 includes an integral bottom wall 43 and a removable upper cover 44 which supports the cathode 42. The cover 44 is formed of any suitable electrically insulating material and is bolted to a flange 45 on the container 41 as by a plurality of bolts 46. An O-ring seal 47 is disposed between the cover 44 and the flange 45 to seal the cover to the tank.

An electrolyte 48 is held within the container and electrolytically connects the cathode 42 and the anodic container 41 which are conductively connected in a completed circuit to the output of a rectifier 49.

A suitable electrolyte consists of a solution of distilled water and sodium or potassium hydroxide. Such a solution has a high electrical conductivity and has no tendency to corrode the electrodes.

To provide a suitable D.C. current for the electrolytic cell, the rectifier input is connected to the secondary 50 of a step-down transformer 51 which has its primary 52 connected to a 110 volt A.C. source, not shown. The positive output terminal 53 of the rectifier 49 is connected to the container 41 and the negative output terminal 54 of the rectifier 49 is connected to the cathode 42 to provide an electrolytic current flow through the electrolyte from the container 41 to the cathode 42. The electrolytic current forms hydrogen gas at the cathode 42 and oxygen gas at the anodic container 41 in a manner well-known in the art. The cathode 42 is provided with a stem 55 which passes through a central opening in the cover 44 and which has a nut 56 tightened thereon to secure the cathode 43 in position. A sealing grommet 57 seals the opening in the cover 44 through which the stem passes.

A series of circumferentially spaced, radially extending passages 58 converge into communication with a central axial passage 59. The axial passage 59 extends outwardly through the stem 55 and has a conduit 60 secured therein. The conduit 60 is connected to the tank cover 8 and the hydrogen gas generated within the electrolytic cell 41 passes from the electrolytic cell to the interior of the tank 2 via the passages 58 and 59 and the connecting tube 60.

To accumulate the hydrogen gas generated in the electrolytic cell 40, an inverted cup 61 of suitable insulating material is disposed over the cathode 43 and forms a trap for the hydrogen gas. The inverted cap 61 is centrally apertured to slip over the cathode stem 55 and is clamped in place by the drawing up the nut 56. An insulating liner 62 covers the bottom wall 43 of the container 41 to distribute or direct the electrolytic current flow to the side walls of container 42. The anode surface is therefore laterally spaced from the cathode cup 61 and the oxygen formed at the anode surface does not enter the cup 61.

As the water which passes through the tank 2 is under pressure, the container 41 is necessarily maintained under a sufficient pressure to force the generated hydrogen gas into the tank 2.

To prevent an excessive accumulation of oxygen gas in the container 41, a float vent 63 is secured within the cover 44. A float 64 normally maintains the vent closed. As oxygen gas accumulates in the container 42, the electrolyte is forced downwardly, and the float 64 consequently lowers. When the electrolyte drops a predetermined amount, the vent 63 opens allowing a portion of the oxygen gas to escape to the surrounding atmosphere.

In the process of generating hydrogen, a small amount of the electrolyte 48 passes off in the form of the noted hydrogen gas and oxygen gas. To periodically replenish the electrolyte 48 a source of water is connected to the electrolytic cell. The source of water is shown as a pipe 65 connecting the tank 2 to the container 41. A hand valve 66 is connected in the pipe 65 to allow manual control of the periodic replenishment of the water.

In case the natural water in the system contains undesirable amounts of chlorides, sulfates and the like which will tend to destroy the anode, a suitable ion exchanger, not shown, can be inserted in line 65 to remove or reduce these constituents in the water which is admitted to the electrolytic cell.

To provide a visual indication of the level of the electrolyte in the cell, a transparent sight gage 67 is connected to the cell wall. A line 68 is drawn on the transparent gage 67 at a predetermined level and when the level of the electrolyte falls to this line, water is to be added.

The operation of the electrolytic cell is stopped when a predetermined quantity of hydrogen gas, sufficiently great to encompass the bed 1, is generated. To stop the electrolytic cell, a float switch 69 is connected in series circuit with the output of rectifier 49 and with the electrolytic cell 41. The switch 69 is shown for purposes of illustration as a mercury switch similar to the switch 23 of FIGURE 1. When the level of the mercury 70 of the switch 69 connects contacts 71, the rectifier 49 is energized and the electrolytic current flows with a resultant hydrogen gas generation. Conversely, when the contacts 71 are disconnected the rectifier 49 is de-energized and no electrolytic current flows thereby resulting in termination of hydrogen gas generation. As hydrogen gas accumulates in the tank 2, the water is pushed back into the water main 20 through the pipe 36. As the water level drops the float switch 69 moves accordingly and at a predetermined location causes the mercury to break electrical connection between contact 71. The generation of hydrogen gas then ceases until water is again withdrawn from the tank 2.

Although essentially pure hydrogen is introduced into the bed in the illustrated embodiments, certain gases such as nitrogen and like in the water may to some extent be displaced and intermix with the hydrogen atmosphere. In the amounts displaced, no deleterious effects have been noted on the performance of the catalyst.

The present invention provides a rapid recovery or regeneration of a water treating bed employing adsorbed hydrogen to remove dissolved oxygen from water.

Various modes of carrying out the invention are contemplated as being within the scope of the following claim particularly pointing out and distinctly claiming the subject matter which is regarded as the invention.

I claim:

Apparatus for removing dissolved oxygen from water, which comprises a vertically disposed housing having an upper inlet water connection and a lower outlet water connection disposed in spaced relation to allow connection of the housing into a water line, an adsorbent bed carrying a catalyst and supported within said housing between the inlet connection and the outlet connection, a source of hydrogen gas adapted to be connected to said housing, means for connecting the source of hydrogen to the housing, means disposed below the bed and above the water outlet and being responsive to the level of water in said housing to admit hydogen gas into said housing, means to prevent gas from backing up through said inlet connection, by-pass means connecting said water line around said housing to allow the water adjacent the outlet side of the housing to back-up into the incoming water line when hydrogen gas is being admitted into the housing and the water line on the outlet side of the housing is closed, and means in said by-pass means to restrict water flow through the by-pass means from the outlet to the inlet side of said housing.

References Cited in the file of this patent

UNITED STATES PATENTS

| | | |
|---|---|---|
| 1,725,925 | Kent | Aug. 27, 1929 |
| 1,731,409 | Fitts | Oct. 15, 1929 |
| 2,127,450 | Schneider et al. | Aug. 16, 1938 |
| 2,365,221 | Shafor | Dec. 19, 1944 |
| 2,515,609 | Mills | July 18, 1950 |
| 2,527,659 | Smith | Oct. 31, 1950 |
| 2,583,110 | MacLean | Jan. 22, 1952 |
| 2,690,379 | Urey et al. | Sept. 28, 1954 |

FOREIGN PATENTS

| | | |
|---|---|---|
| 1,001,725 | France | Oct. 24, 1951 |
| 690,740 | Great Britain | Apr. 29, 1953 |

OTHER REFERENCES

The Condensed Chemical Dictionary, Turner, 4th ed., 1950, Reinhold Publishing Corp., New York, N.Y., p. 16 relied on.